No. 720,341. PATENTED FEB. 10, 1903.
R. E. GATTER.
PROTECTOR FOR MILK JARS.
APPLICATION FILED NOV. 29, 1902.
NO MODEL.

Witnesses
Glenn H. Niles.
C. Bradway.

Inventor
Rudolph E. Gatter
By his Attorneys
Foemer Niles

UNITED STATES PATENT OFFICE.

RUDOLPH E. GATTER, OF NEW YORK, N. Y.

PROTECTOR FOR MILK-JARS.

SPECIFICATION forming part of Letters Patent No. 720,341, dated February 10, 1903.

Application filed November 29, 1902. Serial No. 133,192. (No model.)

*To all whom it may concern:*

Be it known that I, RUDOLPH E. GATTER, a citizen of the United States, residing in New York, borough of Manhattan, and State of New York, have invented certain new and useful Improvements in Protectors for Milk-Jars, of which the following is a specification.

It is a well-known annoyance not only to families occupying private houses but also the inhabitants of apartment and flat houses that frequently the milk-jars delivered by the milkman in the morning are stolen by irresponsible persons to the great annoyance of those for whom the milk was intended, as well as to the milk dealer, who loses thereby his milk jar or bottle. The percentage of the loss of the bottles or jars forms a considerable item of expense of the retailers of fresh and condensed milk.

The object of this invention is to furnish a very simple and cheap device for protecting the filled milk jars or bottles as delivered by the dealer from being exchanged or otherwise tampered with; and for this purpose the invention consists of a device for protecting milk jars or bottles, which comprises a retaining-ring of a size adapted to fit up to the neck of a milk jar or bottle and provided with a notched shank, a stationary casing attached to the jamb of the door-casing and having an open side adjacent the door, a keeper in said casing, and a spring-actuated latch arranged at the inside of the casing and adapted to engage one of the notches of the shank, so as to retain the shank rigidly in position in the keeper and protect thereby the jar against removal.

The invention consists, further, of certain details of construction and combinations of parts, which will be fully described hereinafter and finally pointed out in the claims.

Figure 1:
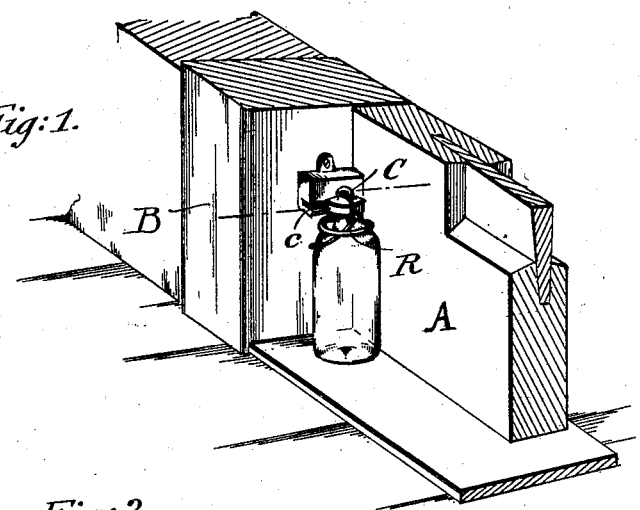
Figure 2:
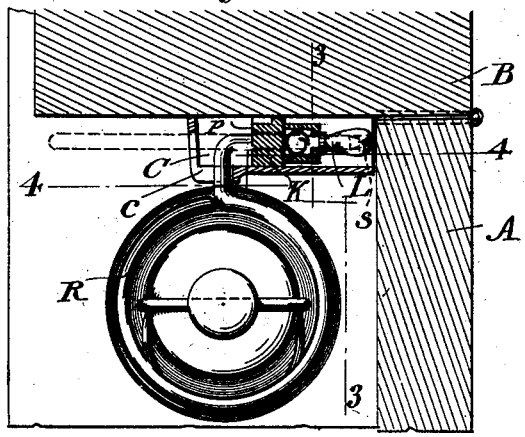
Figure 3:
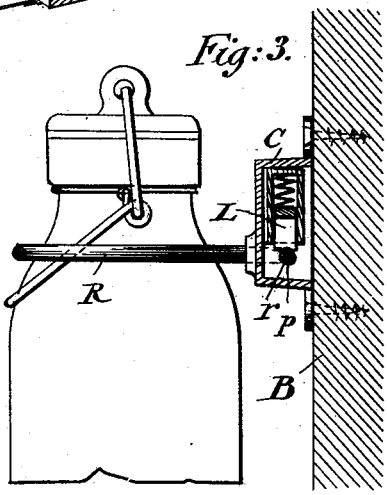
Figure 4:
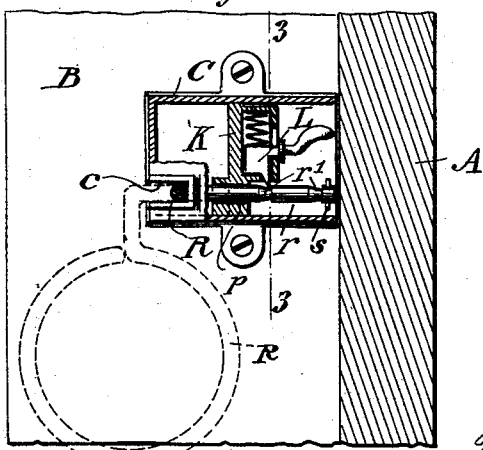

In the accompanying drawings, Figure 1 represents a perspective view of my improved device for protecting milk jars or bottles against theft, showing the jar in position on the door-casing and door. Fig. 2 is a plan view of the same, drawn on a larger scale. Fig. 3 is a vertical transverse section through the casing on line 3 3, Fig. 2; and Fig. 4 is a vertical longitudinal section on line 4 4, Fig. 2.

Similar letters of reference indicate corresponding parts.

Referring to the drawings, A represents the hall-door of a private house, apartment, or flat, and B the door frame or casing of the same. To the lower part of the door-jamb is applied a casing C, which is formed of a cast-metal case provided with a slot or recess $c$ at one corner and which is open at one side where it fits against the door B when the latter is closed, as shown in Figs. 2 and 4. The casing C is attached by means of fastening-screws to the jamb of the door-frame, so that its slotted corner is at such a distance from the bottom door-sill as corresponds to the length of the body of the usual quart milk-bottles.

When it is not desired to place the jar or bottle on the sill, but at some height above the same, a bracket has to be used, the same being secured to the jamb at the proper distance below the casing, and the bottle is then placed on this bracket. In such cases in which the door is made of iron rods—such as the area-doors of private houses, &c.—the casing of the keeper has to be attached to a suitable wooden plate, which is secured to the jamb of the door or to the stone wall adjacent to the same. In this case the bottle is usually placed on the lowermost step of the basement-stairs. The casing C is provided with a keeper or perforated partition K, extending vertically of the casing, the perforation $p$ thereof being in the same plane with the slot or recess $c$. In the slot $c$ and the perforation $p$ of the casing is guided a shank $r$ of the jar-retaining ring R. The shank is provided with one or more notches $r'$, that are adapted to be engaged by a spring-actuated latch L, which is guided in a suitable housing on the partition K of the casing. The inner end of the shank $r$ is provided with a key or other stop $s$, so as to prevent its accidental withdrawal from the perforation $p$ of the keeper or partition K. The retaining-ring is preferably made in one piece with the shank $r$, which latter is formed with a rectangular bend disposed in the same plane with the ring portion, so that the ring when placed in horizontal position, as when engaging the neck of the milk jar or bottle, will be supported in that position by the bent portion of the shank engaging or being confined between the edges of the slot *c*. The rectangularly-bent shank enters into the corner-recess of the casing when the retaining-ring is applied to a milk jar or bottle and the shank pushed inwardly into the casing, so as to be locked by the latch. In this position of the ring the full jar is firmly held in position and prevented from being removed by the locking action of the latch and the keeper on the shank of the ring. When the milk-jar is to be taken in in the morning, it can be readily removed from the protecting device when the door is opened, as access is then given to the open side of the casing C. The latch is then released from the shank by removing it with the finger, so that the ring, together with the bottle, can be moved outwardly in the keeper and slot until the second notch is engaged by the latch or the stop *s* abuts upon the keeper K. In this position the ring can be readily turned up from the neck of the jar, and the jar is at the same time lifted out. The jar is then taken away and the protecting-ring dropped by gravity into position alongside of the casing, as shown in dotted lines in Figs. 2 and 4. The empty jar is placed in the usual manner on the outside of the door, so as to be taken away by the milkman when he delivers a new filled jar, the empty jar not being supposed to be protected by the device. The filled jar is applied to the protecting-ring by swinging the latter up in a raised position to insert the neck of the jar, then turning the ring down to a horizontal position, and pushing the ring and jar together toward the door, as shown in Figs. 2 and 3, so that the latch engages the first notch in the shank of the ring, and thereby locks the bottle in position, so that it cannot be removed except when the door is opened to permit access to the latch in the casing, and thereby to the jar.

The improved protecting device for milk jars and bottles prevents the stealing of the full jar or bottle and obviates thereby the annoyance incident thereto to the customer. It also prevents the loss of the bottles to the dealer and forms a cheap and convenient device for securing the full jar in position and preventing the abstraction of the same by unauthorized persons.

Having thus described my invention, I claim as new and desire to secure by Letters Patent—

1. A protecting device for milk jars and bottles, consisting of a retaining-ring of the size of the neck of the jar or bottle, said ring being provided with a notched shank, a casing, a keeper therein for said shank, and a spring-actuated latch attached to the inside of the casing for locking the shank in position in the keeper, substantially as set forth.

2. A protecting device for milk jars or bottles, consisting of a retaining-ring, a notched shank connected therewith, a casing having a slotted portion for receiving said shank, a spring-actuated latch at the inside of the casing adapted to engage one of the notches in said shank, and a keeper at the inside of the casing for guiding the shank of said ring, substantially as set forth.

3. A protecting device for milk jars or bottles, consisting of a retaining-ring adapted to fit to the neck of the jar or bottle, a bent shank being provided with notches, a stop at the end of said shank, a casing open at one side for fitting against the door and having a recess at one corner, a keeper or partition-wall adjacent to said recess, and a spring-actuated latch on said keeper adapted to engage one of the notches of the shank, the recess of the casing being adapted to engage the bent shank to prevent swinging of said ring in locked position, substantially as set forth.

4. The combination, with means for preventing the longitudinal displacement of a bottle, of a movable retaining-ring, means supporting said ring adjacent the bottle to be locked, and in position to be moved into and out of engagement with a free end of said bottle, and means for locking said ring in engaging position, substantially as set forth.

In testimony that I claim the foregoing as my invention I have signed my name in presence of two subscribing witnesses.

RUDOLPH E. GATTER.

Witnesses:
PAUL GOEPEL,
HENRY J. SUHRBIER.